US007890876B1

(12) United States Patent
Mandelbaum et al.

(10) Patent No.: US 7,890,876 B1
(45) Date of Patent: Feb. 15, 2011

(54) ELECTRONIC MESSAGING CONTEXTUAL STOREFRONT SYSTEM AND METHOD

(75) Inventors: Josef A. Mandelbaum, Beachwood, OH (US); Benjamin J. Tripoli, Woodbury, MN (US); Jeffrey M. Rapp, Minneapolis, MN (US); Bryan A. Malkowski, Lilydale, MN (US); Jason S. Jhonson, Cupertino, CA (US); Bryan A. Biniak, Los Angeles, CA (US); Dave Higham, Husdson, OH (US)

(73) Assignee: American Greetings Corporation, Cleveland, OH (US)

( * ) Notice: Subject to any disclaimer, the term of this patent is extended or adjusted under 35 U.S.C. 154(b) by 804 days.

(21) Appl. No.: 11/836,453

(22) Filed: Aug. 9, 2007
 (Under 37 CFR 1.47)

(51) Int. Cl.
 *G06F 3/00* (2006.01)
(52) U.S. Cl. .................. 715/758; 715/744
(58) Field of Classification Search .............. 715/758
 See application file for complete search history.

(56) References Cited

U.S. PATENT DOCUMENTS

| 7,234,117 | B2 * | 6/2007 | Zaner et al. ............ 715/758 |
| 7,478,129 | B1 * | 1/2009 | Chemtob ............... 709/204 |
| 7,503,007 | B2 * | 3/2009 | Goodman et al. ........ 715/758 |
| 2002/0077135 | A1 * | 6/2002 | Hyon ................. 455/466 |
| 2004/0162877 | A1 * | 8/2004 | Van Dok et al. ........ 709/204 |
| 2005/0156873 | A1 * | 7/2005 | Walter et al. .......... 345/156 |
| 2008/0101701 | A1 * | 5/2008 | Rainisto ............. 382/187 |
| 2008/0214214 | A1 * | 9/2008 | Reissmueller et al. .... 455/466 |
| 2008/0244446 | A1 * | 10/2008 | LeFevre et al. ........ 715/810 |
| 2009/0019117 | A1 * | 1/2009 | Bonforte et al. ........ 709/206 |
| 2010/0138756 | A1 * | 6/2010 | Saund et al. .......... 715/758 |

\* cited by examiner

*Primary Examiner*—Ryan F Pitaro
(74) *Attorney, Agent, or Firm*—Roetzel & Andress; James C. Scott

(57) ABSTRACT

An electronic messaging contextual storefront system and application provides electronic and instant messaging with contextual graphical and textual content which corresponds with or is related to the subject matter of an electronic or instant message string or chat stream. Graphical and textual content for the contextual storefronts is retrieved based upon detected keywords, and presented in contextual storefronts which are associated with conversation and text entry boxes or other parts of an electronic message system display. Selected graphical and textual content can be placed directly in the text stream or elsewhere in the display either by user commands or automatically by the system. The graphical and textual content is stored by subject matter or theme or by association with keywords in a relational database. Access to contextual storefront content can be tracked, accounted for and controlled by a payments processing system.

24 Claims, 7 Drawing Sheets

ELECTRONIC MESSAGING CONTEXTUAL STOREFRONT SYSTEM AND METHOD

RELATED APPLICATIONS

There are no pending applications related to this application.

FIELD OF THE INVENTION

The present invention is in the general field of computing and messaging, and more particularly in the field of instant messaging and related multi-media.

BACKGROUND OF THE INVENTION

Electronic messaging, (i.e. "e-mail"), instant messaging ("IM") and text messaging between wireless devices have evolved from simple text-only ASCII formats to visually enhanced and multi-media interfaces with customizable features. Examples of electronic messaging improvements and innovations include graphics such as framing, font and background selection and coloring, audio such as log-on/log-off arrival and departure audio signals, and selectable graphics such as Smileys™ or Emoticons™ and digital images and video or swif files. These types of improvements and enhancements are intended to make electronic messaging easier to use, more interactive and more entertaining.

Current forms of electronic messaging systems, such as those provided by America Online, Yahoo, MSN and Google, are configured primarily for ease of use, speed or efficiency, and a small degree of entertainment or social networking and personal expression or personalized greeting value. The widespread use of e-mail and instant messaging for business and social communication has made it one of the universal modes of communication in modern societies. The rapid proliferation of wireless devices has further increased the volume of electronic messages.

Advertising is a very large component of internet website content. The principal formats of website advertisements are so-called "banner ads" which appear as framed graphic and text images at the top, bottom or sides on a web page, and "pop-up" ads which appear as framed graphic and text images which are overlayed and displayed on top of a web page, thereby blocking out the covered area of the underlying web page. Banner ads have proven to be very effective and are therefore ubiquitous on general public and information websites. On the contrary, pop-up ads are universally regarded as intrusive annoyances, mainly because they obliterate the website page which is trying to be viewed. The amount of advertising on a website or web pages is correlated to the amount of traffic or visits to the site or page. The widespread use of electronic and instant messaging lends the format to effective advertising and related online sales transactions for electronic and physical products.

SUMMARY OF THE INVENTION

The disclosure includes systems and methods for the presentation and use of graphical and textual content in connection with electronic messaging systems, and in particular with instant messaging systems, to provide an electronic messaging system which includes a contextual storefront of graphical and textual content which corresponds in some way with some aspect of the messaging content or subject matter.

One aspect of the disclosure includes a computer program which generates a client-user interface for creating and transmitting and receiving textual and graphic electronic messages between a first user and a second user, the client-user interface having a first display which includes a conversation box and a text entry box, the conversation box configured to display messages which are entered by a first user and a second user into the text entry box; a conversation box graphical storefront including a first set of one or more graphical images; a text entry box graphical storefront including a second set of one or more graphical images; the computer program operative to enable selection by a client-user of a graphical image from the conversation box graphical storefront or the text entry box graphical storefront for insertion into the text entry box, and to select graphical images from a database of graphical images for inclusion in the conversation box graphical storefront of the text entry box graphical storefront based upon textual content which appears in the text entry box or in the conversation box. User selection of graphical content from the conversation box graphical storefront or from the text entry box graphical storefront may be enabled as part of the application, or based upon a pre-paid subscription, or based upon an incurred charge per item or package of items.

Another aspect of the disclosure includes a computer program which generates a client-user interface for creating and transmitting and receiving textual and graphic electronic messages between a first user and a second user, the client-user interface having a first display which includes a conversation box and a text entry box, the conversation box configured to display messages which are entered by a first user and a second user into the text entry box; a conversation box textual storefront including a first set of one or more textual content items in the form of text segments; a text entry box textual storefront including a second set of one or more text segments; the computer program operative to enable selection by a client-user of a text item from the conversation box textual storefront or the text entry box textual storefront for insertion into the text entry box, and to select textual images from a database of text items for inclusion in the conversation box textual storefront of the text entry box textual storefront based upon textual content which appears in the text entry box or in the conversation box. User selection of text items from the conversation box textual storefront or from the text entry box textual storefront may be enabled as part of the application, or based upon a pre-paid subscription, or based upon an incurred charge per item or package of items.

Another aspect of the disclosure includes an electronic messaging contextual storefront system which has an application residing on an application server which is connected via a network to two or more client user devices capable of sending and receiving electronic messages which contain textual and graphic content; the application server communicatively connected to a contextual storefront content server having access to multiple different items of textual and graphical content; the application operative to retrieve multiple items of graphical or textual content based upon textual content of messages sent or received via the system, and to generate a display which includes at least one contextual storefront which includes multiple items of graphical and textual content. The application is further enabled to allow selection by a user of one or more items of graphical and/or textual content from at least one contextual storefront for placement in a text entry box or in a conversation box of the display.

DETAILED DESCRIPTION OF PREFERRED AND ALTERNATE EMBODIMENTS

Figure 1:
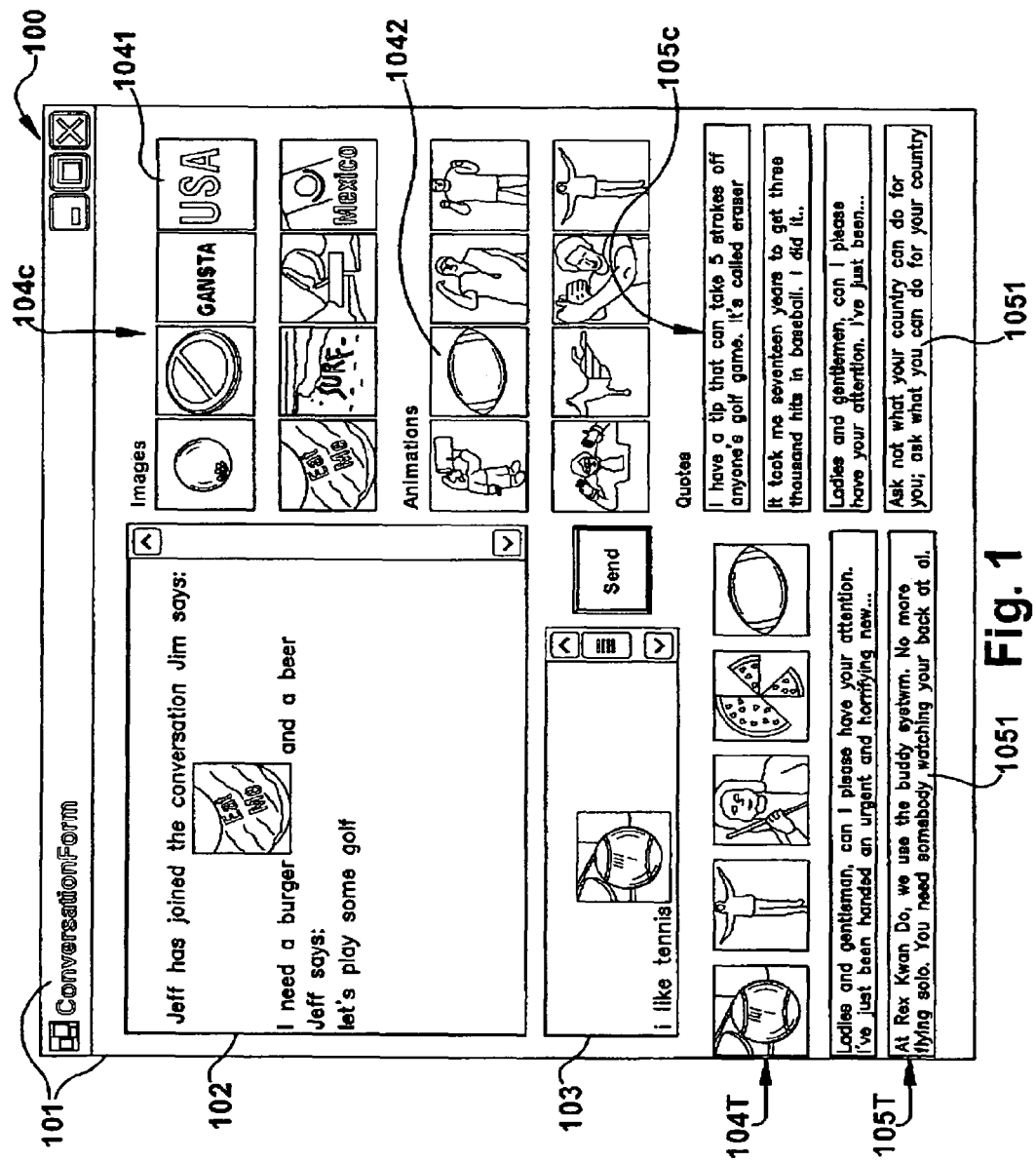
FIG. 1 is a representative client displays of a contextual electronic messaging storefront of the disclosure.

With reference to FIG. 1, there is illustrated a representation of an expression of some of the concepts and principles of the disclosure, in the form of a computer monitor screen display ("display") or page layout configured for display on a computer display or monitor, in the format of an online or instant messaging application or as a website page, the display referenced generally at 100, which may include a standard Windows™ type frame 101 within which are formed smaller windows, subframes or boxes, including for example a conversation box 102, and a text entry box 103. In an electronic messaging or instant messaging application, a conversation box such as conversation box 102 generally refers to a portion or area of the display 100 in which messages, which have been created and sent by users of the electronic messaging system and application, are posted and appear as part of the display 100. The text entry box, such as text entry box 103, refers to a portion or area of the display 100 in which messages are entered or created by users of the electronic messaging system and application, before being transmitted to other users of the system or application and displayed within the conversation box 102.

The application which generates the screen display 100 is also operative to enable text entry, for example within the text entry box 103, and to display within the conversation box 102 both text which is entered in the text entry box 103 and which is received from one or more network-connected users of the application. A conversation box graphical storefront 104C is displayed within the frame 101, and includes one or more static graphical images 1041 and one or more animations or video images 1042, collectively and alternatively referred to herein as "graphical images" Or "graphical content". The animations or video images 1042 may be in the form of static representations of an animation or video, or in the form of video loops which play within an individual frame of each animation 1042. Content for the conversation box graphical storefront 104 is selected and loaded by the application, as further described, based upon keywords which are detected in the conversation box 102, in the text entry box 103, or on the intersection of keywords detected in the conversation box 102 and the text entry box 103. The application enables graphical content to be selected by a user from the conversation box graphical storefront 104C for insertion in the text entry box 103. Also, the application can be configured to perform automatic correlative and/or random placement of graphical content into the conversation box 102 or into the text entry box 103. Although the graphical content which is displayed in the conversation box graphical storefront 104C can be selected by the application for display based on keywords detected in the conversation box 102, the application can also be configured to allow additional graphical content to be added to the storefront 104C by a client/user, by for example a drag-and-drop operation or by use of a browser to select jpeg or other images from a user's computer hard drive.

The application is further operative to enable user selection of graphical content from the conversation box graphical storefront 104C, for example by double clicking on an image 1041 or animation/video 1042, for insertion directly into the conversation box 102 or more specifically within the text stream within the conversation box 102 or within the text entry box 103, as shown in FIG. 1. The placement of selected graphics 1041 or animations 1042 may be for example at the current location of a cursor, or by a drag-and-drop operation, whereby the selected graphical content is transmitted into the conversation box for display to all connected clients. Other modes of graphical content selection can be enabled, such as by Fn or Alt keys to sequence through the images 1041 or animations 1042, or other shortcut operations which accomplish the selection of images 1042 or animations 1042 and placement.

One embodiment of the disclosure as further represented by FIG. 1 also includes a separate graphical storefront 104T, also referred to herein as the "text entry box graphical storefront", in which graphical content, i.e., static or animated images, is selected by the application from a database based on keywords detected in the text entry box 103, in the conversation box 102, or on the intersection of keywords detected in the text entry box 103. The text entry box graphical storefront 1041 may have some of the same or different images 1041 and/or animations 1042 as in the conversation box graphical storefront 104C. The disclosure thus includes multiple graphical storefronts associated with different areas or portions of a display of a messaging system.

The display 100 further includes one or more text storefronts 105 (or "text storefront"), such as text storefront 1050, which may be located proximate to the conversation box 102 and/or proximate to the conversation box graphical storefront 104C, and text storefront 105T which may be located proximate to the text entry box 103, and in which are listed one or more text segments 1051 which are selectable for placement in the conversation box 102 or in the text entry box 103. Textual content for the textual storefronts 105C, 105T is selected by the application from a database based on keywords detected in the conversation box 102, in the text entry box 103, or based on the intersection of keywords detected in the conversation box 102 and in the text entry box 103. Examples of content for the textual storefronts 105C and 105T include text segments 1051, such as quotes, phrases or any sequence or combination of alpha-numeric communication, which are selectable from the text entry storefront 105 in the same manner or manners as graphical content 1041, 1042, i.e., right-clicking or other selection and placement functionality such as select-drag-and-drop which the application enables. The application may also be programmed so that double-clicking on any of the images display in the graphical storefronts 104C, 104T or in the textual storefronts 105C, 105T will enter the selected content into the conversation box 102 or into the text stream in the conversation box 102 at the cursor location in the text entry box 103 for subsequent display in the conversation box 102 of the display of all active or network-connected clients. Entry of user-generated content for the textual storefronts may also be enabled. Automated and/or random placement of text segments 1051 in the conversation box 102 or in the text entry box 103 may also be enabled.

The application is further programmed to track and record the selection and/or placement of graphics 1041, animations 1042 and text segments 1051 in the conversation box 102 or text entry box 103 for accounting purposes, and to enable a revenue based version of the application in which users are billed according to use of the described graphical and textual content over a particular period or during a messaging session. Exemplary accounting and billing arrangements include per item charges for each item of graphical or textual content, subscriptions which include access to some or all of the graphical and textual database content, and quantity packages which fix the total number of graphical images and textual items which are accessible or usable per payment.

As used herein, the term "graphical storefront" refers collectively to the conversation box graphical storefront 104C and to the text entry box graphical storefront 104T. As used herein, the term "textual storefront" refers collectively to the conversation box textual storefront 105C and to the text entry box textual storefront 105T. As used herein, the term "application" refers to the contextual storefront application which generates and enables the described computer operations including but not limited to the generation and operation of each of the described displays and attendant functionality and transmission, receipt and display of electronic messages and associated content, including graphical and textual content. As used herein, the term "system" refers in one sense to the combined hardware and software applications which is used to provide networked electronic messaging with the described contextual storefront with the features and functions of the disclosure. As used herein, the terms "client", "user" and "client/user" refers to users of the electronic messaging system and to user interfaces with the electronic messaging system, such as computers, personal computers or portable electronic devices by which the electronic messaging system can be accessed and used.

Figure 2:
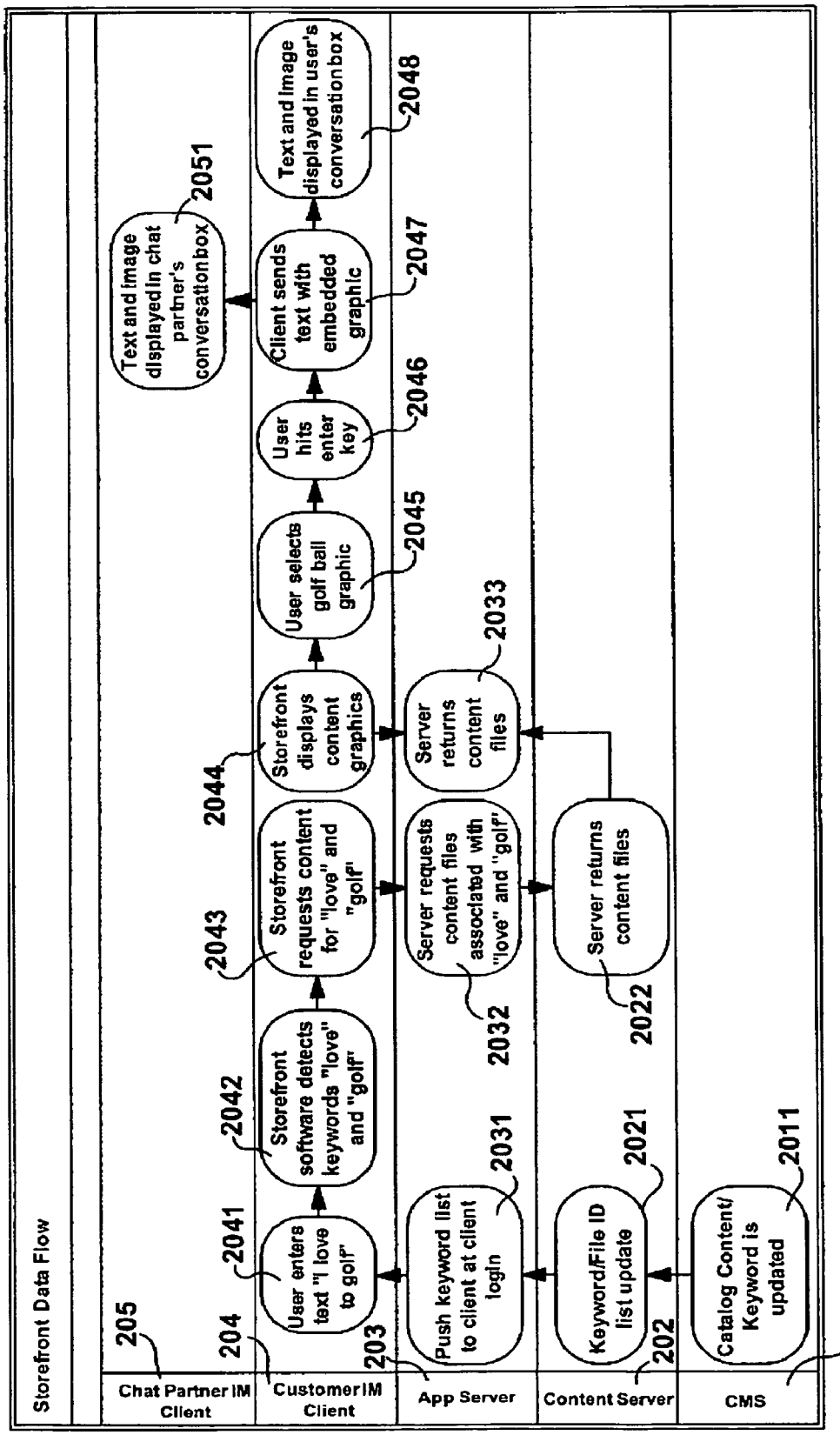
FIG. 2 is a schematic of a representative data flow in a contextual electronic messaging storefront system of the disclosure.

FIG. 2 schematically illustrates an exemplary client/server data flow 200 in accordance with the electronic messaging contextual storefront system and method and application of the disclosure, particularly with respect to the storefront data flow for either or both the graphical storefronts 104C, 104T and/or the textual storefronts 105C, 105T. Catalog content including keyword lists with file identifiers 2011 are propagated from a content management system (CMS) 201 to a content server 202 at step 2021 and to application server 203 at step 2031 via publish/subscribe (pub/sub) as keyword catalogs are compiled and/or updated. The application server 203 is configured to update the client metadata as needed. The keyword list is preferably pushed to the customer IM client 204 at step 2031 at client login or upon request.

When a user of the customer IM client 204 enters text at step 2041, such as for example, "I love to golf", the contextual storefront application detects at step 2042 the keywords "love" and "golf" within the text stream and, at step 2043, requests corresponding graphical content from the CMS 201. The application server 203 requests at 2032 the content files associated with the keywords "love" and "golf", from the server at 2022, which returns the content files at 2033 for display as the storefront graphics content at 2044, i.e., the content for the graphical storefronts 104C, 104T. Once the corresponding graphics have been retrieved and displayed, the user selects one of the graphic files at steps 2045, 2046, by for example clicking on one of the jpeg images 1041 or an animation 1042 in one of the graphical storefronts 104C, 104T and pressing Enter or by any other programmed operation, for inclusion or transfer of the selected graphic 1041 into the text entry box 103, as shown for example in FIG. 1, either embedded within the text stream or elsewhere within the text entry box 103. Placement of the selected graphic within the conversation box 102 can be similarly performed by for example location of the cursor.

With the selected graphic 1041 or animation 1042 now present within the text entry box 103, the user may send or transmit the message in the graphic-enhanced form at step 2047 for display of the text with accompanying graphic in the conversation box 104 of the user at 2048, and in the conversation box 104 of another network-connected user of the system, i.e. a "chat partner", step 2051.

The described process may be repeated with some or all of the successive transmission of messages in the system, so that there may be continuous or intermittent graphics transmitted with the textual messages. Also, depending upon the extent of the CMS graphics and animation catalog content, the graphical storefronts 104c, 104T may be continuously re-populated with different images 1041, 1042 according to the text which appears in the conversation box 102 or in the text entry box 103.

Figure 3:
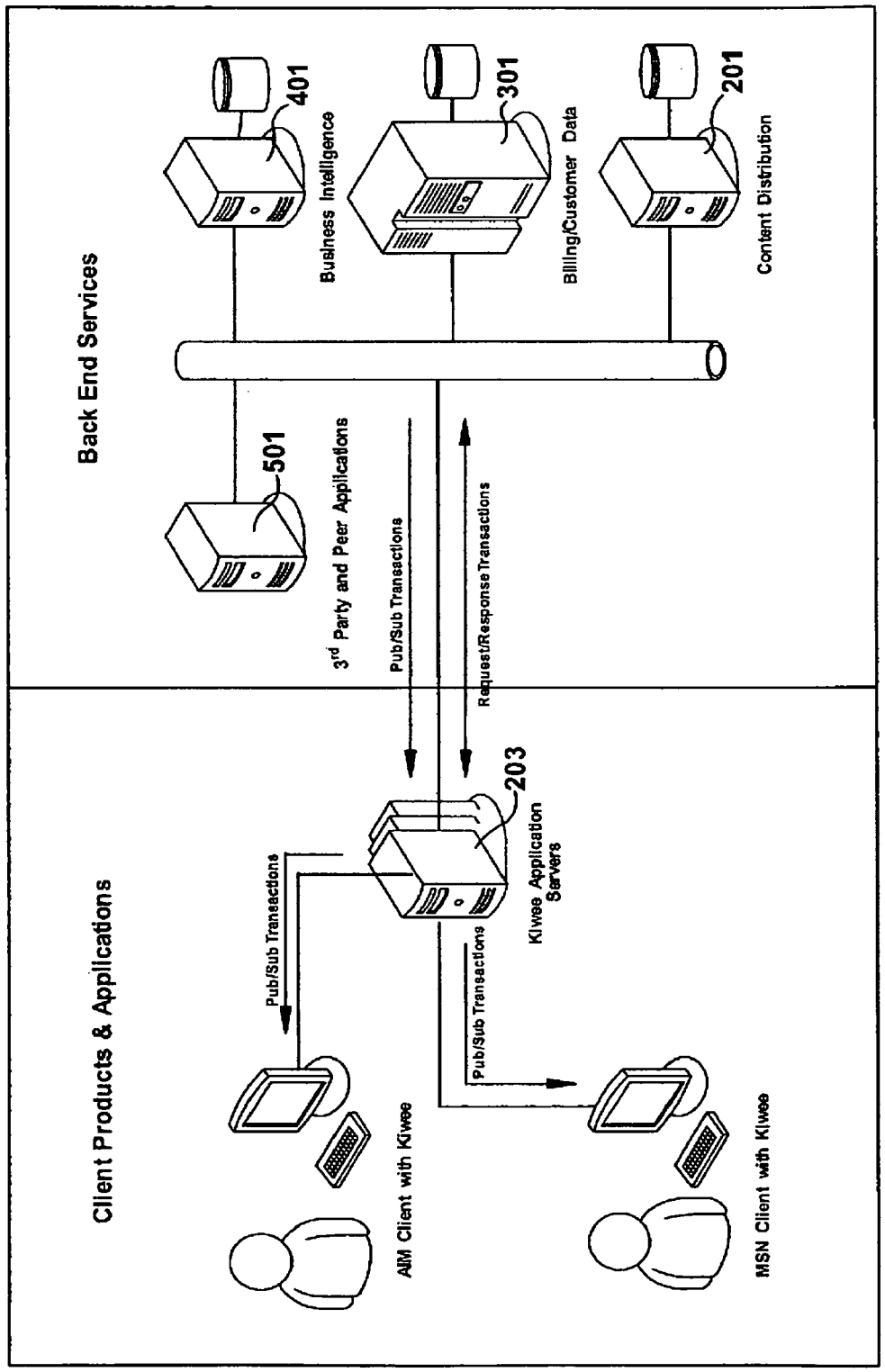
FIG. 3 is a schematic diagram of representative hardware, applications, data flow and interactions of a contextual electronic messaging storefront system of the disclosure.

FIG. 3 schematically illustrates representative client, application and service layers of the electronic messaging contextual graphic and textual storefront system. System users, such as for example subscribers to instant messaging services such as those provided by AIM and MSN, are network-connected to the application server 203 which performs the described pub/sub transactions and request/response transactions of the application with the back end services which include the CMS 201, and with other servers containing related information such as customer and billing data 301, business intelligence 401 and any third party or peer applications 501.

Figure 4:
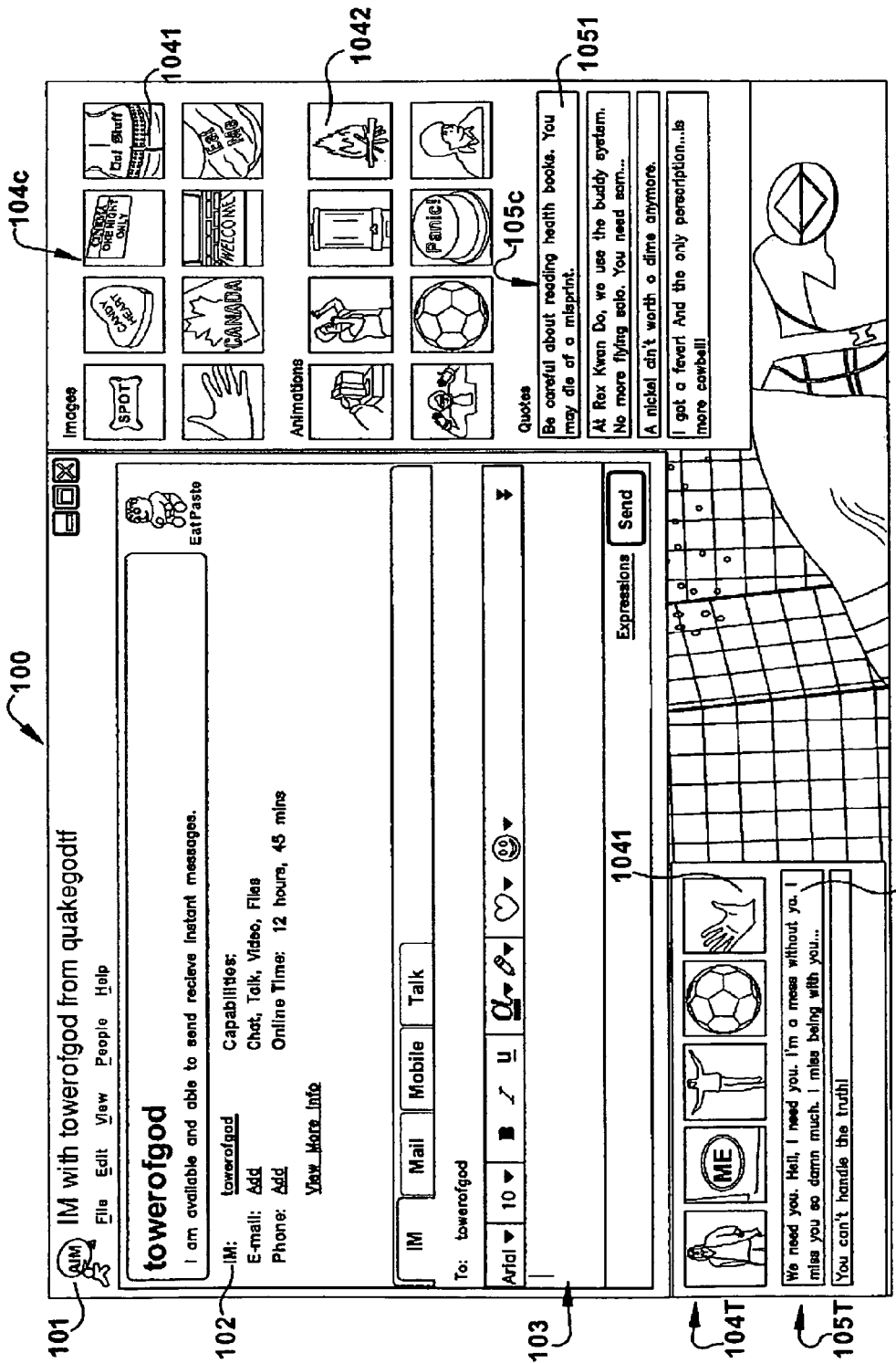
FIGS. 4-7 are representative client displays of various states and conditions of a contextual electronic messaging storefront system of the disclosure.

FIGS. 4-7 illustrate a sequence of an operational example of an alternate embodiment of the electronic messaging contextual storefront system of the disclosure. In FIG. 4, there is shown an alternative display 100, such as a computer monitor display or other screen display, with frame 101 about the conversation box 102 and a text entry box 103. Adjacent or proximate to the conservation box 102 is the graphical storefront 104C containing a plurality of static images 1041 and a plurality of animations 1042 (or static or dynamic representations of animations). Also located adjacent or proximate to the conversation box 102 and/or text entry box 103 is the text storefront 105C containing one or more items of text 1051 in the form of quotes, excerpts or any other type of textual or alpha-numeric information. Together the graphical storefront 104C and text storefront 105C make up a conversation box storefront, the graphical and textual contents of which is populated based upon keywords detected by the application in the conversation box 102 or based upon the intersection of keywords detected by the application in the text entry box 103 and keywords detected in the conversation box 102.

As with the previously described embodiment, a second presentation of a graphical storefront 104T and text storefront 105T is presented preferably proximate to the text entry box 103. Together, the text entry box graphical storefront 104T and text entry box textual storefront 105T make up a text entry box storefront, the graphical and textual contents of which is populated based upon keywords detected by the application in the text entry box 103, or based upon the intersection of keywords detected by the application in the text entry box 103 and keywords detected in the conversation box 102. The electronic messaging contextual storefront system is thus configured and ready for creation and transmission/receipt of messages which include associated graphical content and pre-recorded or customized textual content.

Figure 5:
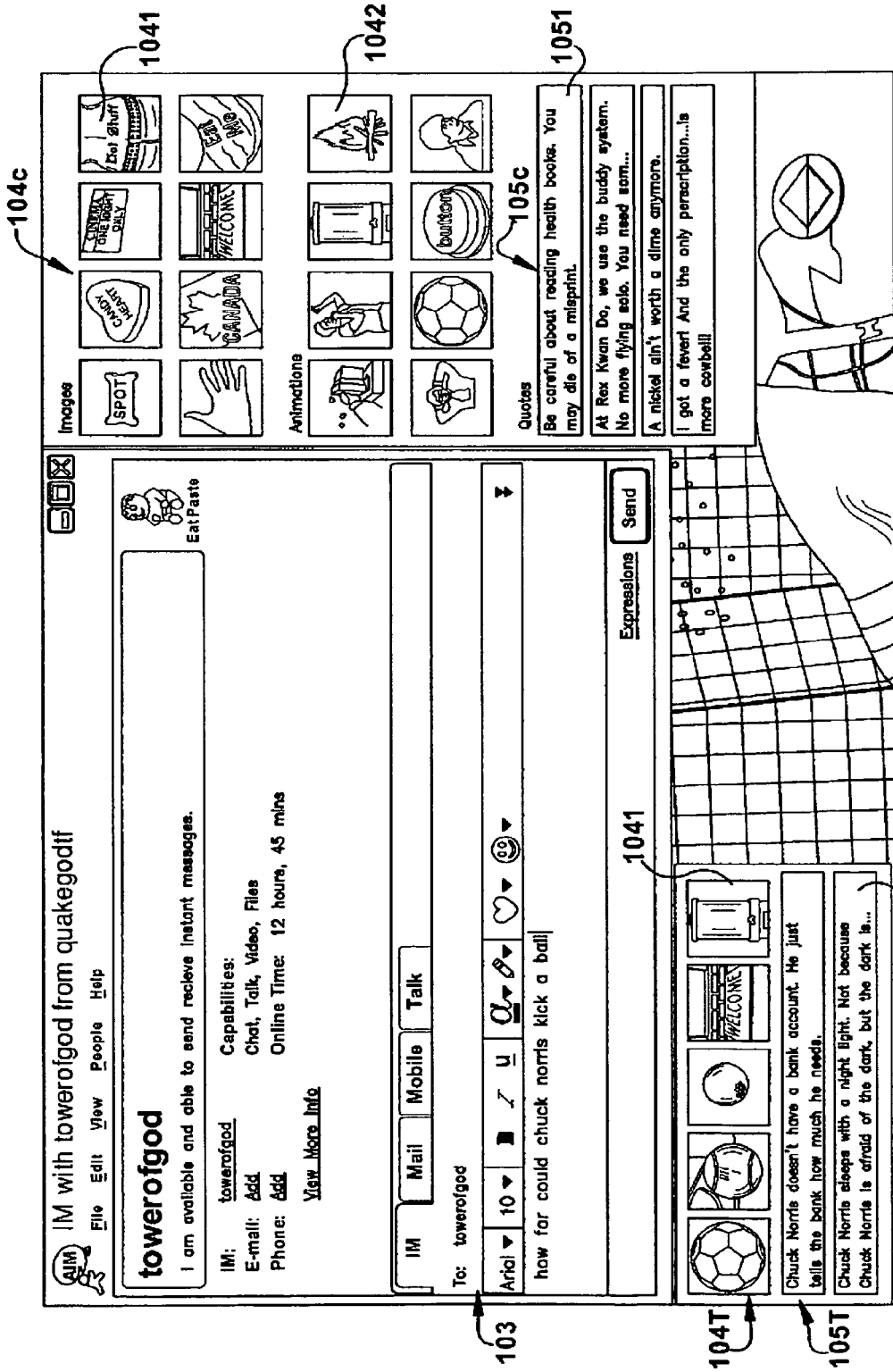

A contextually-enhanced electronic messaging sequence begins as shown in FIG. 5 with the entry of a word, phrase or word combination in the text entry box 103. The application selects and retrieves content, in the form of images 1041 and text items 1051 and loads it to the text entry graphical storefront 104T and text entry textual storefront 105T for selection by the user for inclusion in the text entry box 103. For example, the use of the word "ball" is detected by the application and results in the retrieval and placement of one or more images 1041 of balls, such as a soccer ball, tennis ball or golf ball in the text entry graphical storefront 104T. The text items 1051 which are retrieved and displayed in the text entry box textual storefront 105T may be related to the graphical items 1041 or not.

Figure 6:
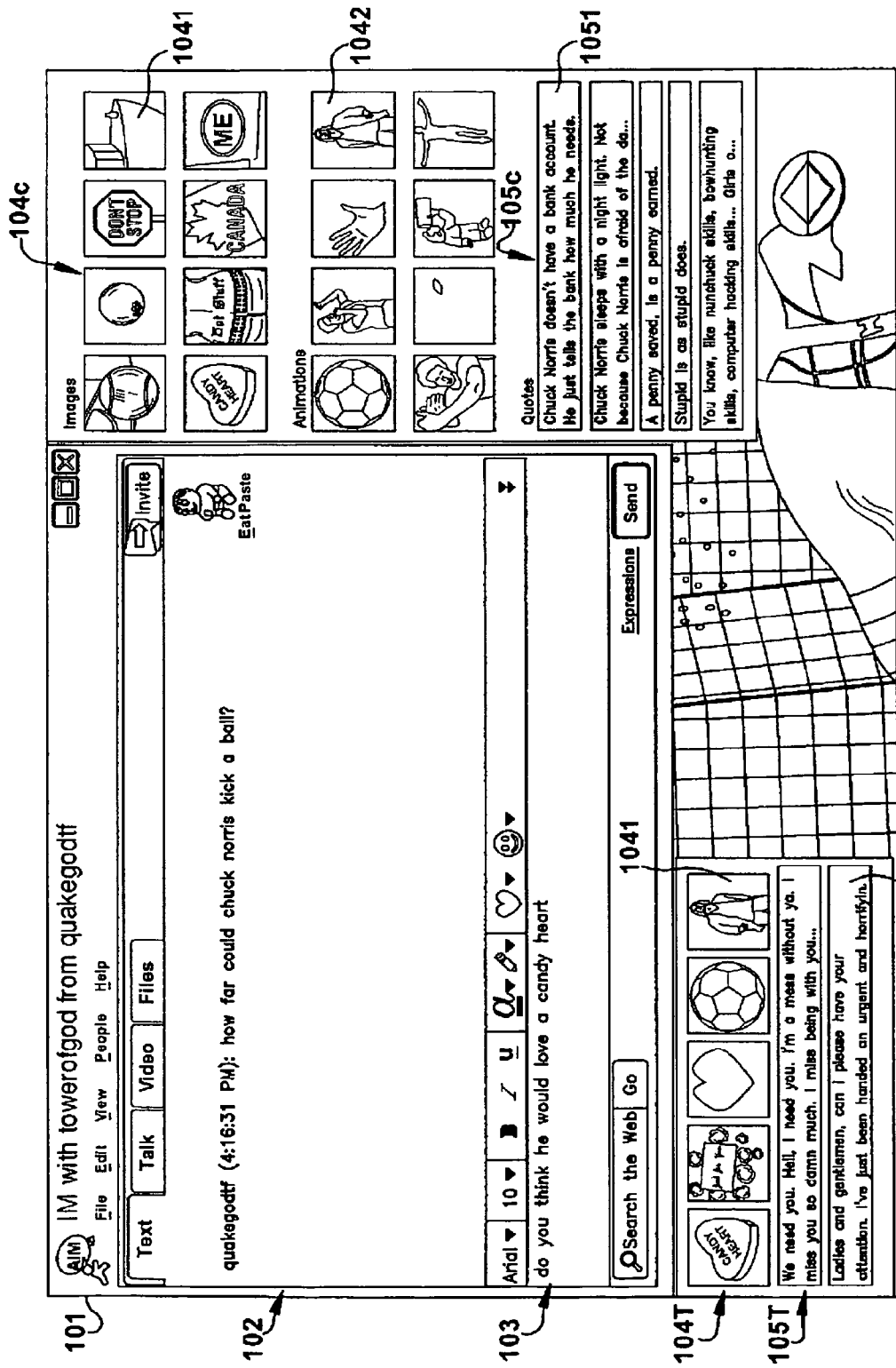
Figure 7:
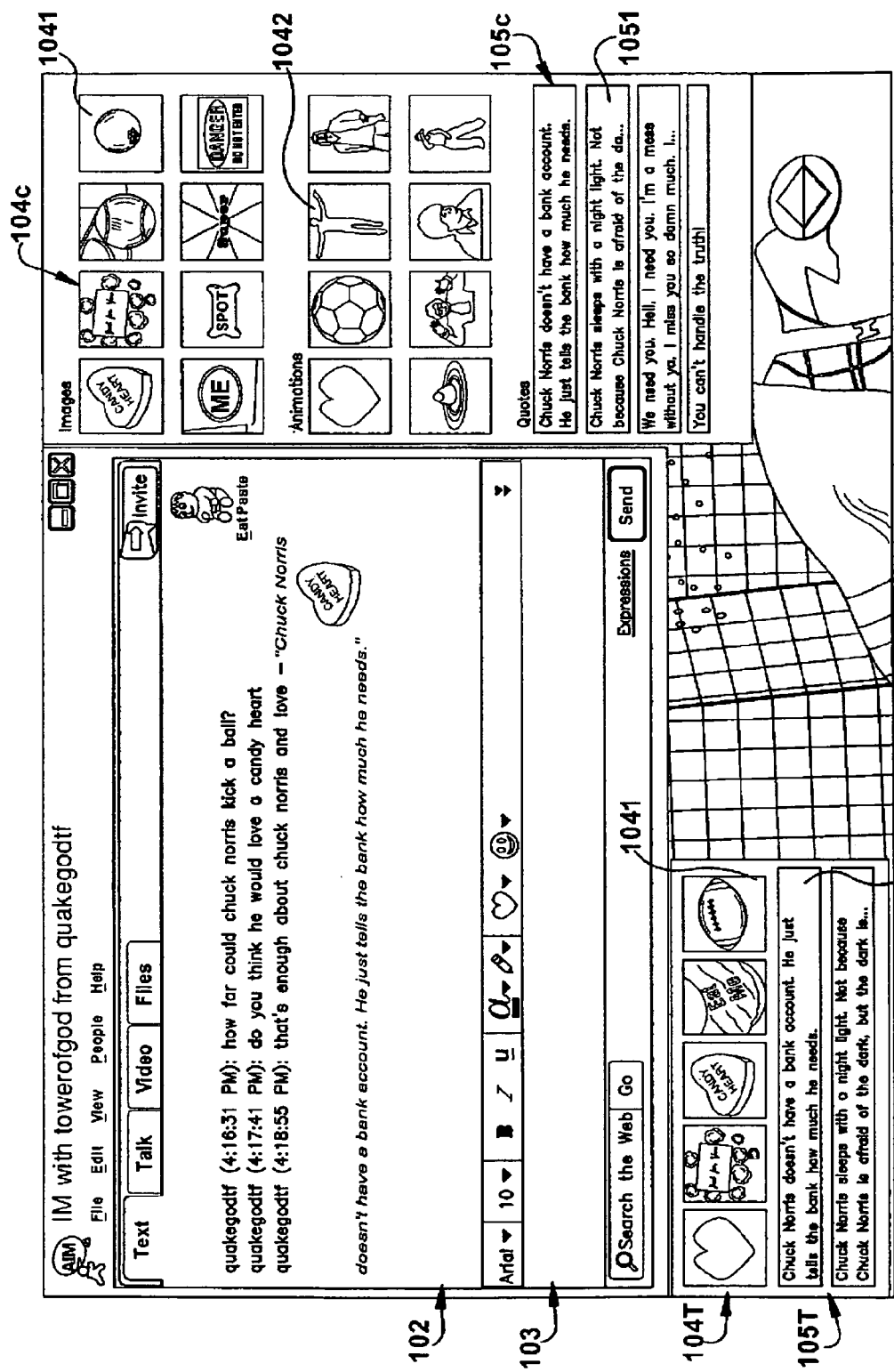

As shown in FIG. 6, the text which is entered in the text entry box 103 is transferred into the conversation box 102, but without any graphics items 1041 or text items 1051 because the user did not select either from the text entry graphical storefront 104T or text entry text storefront 105T. Based upon the next text entry in the text entry box 103, e.g. "do you think he would love a candy heart", the application retrieves and displays additional graphical items 1041 in the text entry graphical storefront 104T based on the adjective and noun "candy heart". The user then selects one of the graphical items 1041, for example the image of a candy heart, for placement in the text entry box 103 for transmission to the conversation box 102, as shown in FIG. 7.

The graphical images 1041 and animations 1042 may be stored, accessed and delivered in bundles or packs, which are assembled according to subject matter, occasions, demographics, themes or any other criteria or parameter. In a revenue-generating version of the application, access to such bundles or packs, whether of graphical or textual content, can be gained via a one-time or repeat payment or subscription processed in accordance with conventional on-line payments processing systems which can be integrated into the application. For any particular use or application of the messaging system, bundles or packs of graphics 1041 and/or animations 1042 can be provided to optimize the retrieval and presentation of content-appropriate media to the text stream in real-time.

The application may also be coded to enable users to upload content into the databases of the graphical images 1041 and/or animations 1042, or to import user-provided content directly into the text stream, i.e., into the conversation box 102, without pre-loading or pre-storing.

The application may also be coded to enable users to associate selected words, keywords or phrases which they desire to be associated with any of the graphical images 1041 and/or animations 1042. An example of this feature is a selected noun, such as a person's name or the name of an object, being associated with an image of that person or object, which image is embedded into the text in the text entry box 103 next to the noun/name and input and transmitted in this form to the conversation box 102 as previously described. Additionally, the keyword-graphic association function of the application can be established as one or more presets in a customized configuration of the application. This function allows users to personalize the graphical content of the contextual storefront and the resulting graphic-enhanced messaging experience. The same customization functions are applicable to the text items 1051.

The application may also be coded to search and analyze previous text streams for subject matter content, such as references or names, as a starting point or foundation from which to populate the graphical images 1041 and animations 1042. The extent of previous message content analysis or searching may be set or adjusted according to files sizes or privacy restraints.

The application may also be configured to data mine or perform word or content searches of past conversations in order to pre-populate or pre-load appropriate content to the storefronts. For example, the application may scan the last few lines of a prior conversation between two users when they start up a subsequent chat session and load content appropriate to the subject matters of the previous conversation.

A further aspect of the content-tracking feature of the application is to monitor and report commonly used words that are not already stored as keywords or associated with graphical images. Once identified according to set criteria such as frequency of use, newly identified keywords can be screened and added to the database with relationships to graphical content. Also, the system can be continuously or periodically updated with new keyword, textual and graphic content.

The application may further include intelligent search features, such as context and prediction functions using contextual and predictive searching algorithms, in addition to manual search capabilities which are intuitive in order to minimize the amount of time and steps required to find particular content. Background macros may be provided such as a bad speller dictionary and spelling correction for recognized keywords. Also, a dictionary and thesaurus suited for IM lingo, parlance, shorthand and slang, and alternatives to modern English may be included. A parlance translator, configured to perform automated translation of text segments into selected dialects, such as e.g., ebonies, or colloquial words and phrases may also be included. A source for synonyms, particularly for keywords, may also be provided.

Although the disclosure is made primarily in the form of instant messaging type electronic message systems, the principles and concepts of the disclosure are equally applicable to e-mail systems and formats, chat rooms, bulletin boards and interactive web sites and web logs, or with any IP-enabled conversation system or application including mobile (wireless), VoIP (including voice recognition software), webcam conversation systems and applications, and mobile/wireless IM, mobile/wireless short message service (SMS) text messaging and video messaging.

As described, the disclosure is in one form an instant messaging contextual merchandising system which graphically presents relevant merchandise for purchase based on the context of communication in the chat stream. There can be provided a context merchandising plug-in as an executable file which can be downloaded, and which may include the following modules:

A context searching and matching engine may also be coded in the application to perform the computing tasks of reading the chat stream, comparing the chat stream with a dictionary or keyword database or words selected by a user/client that are mated up with available merchandise that is presented to the user for purchase.

A merchandising window may be delivered and displayed as part of the downloaded plug-in payload. The merchandising window will be represented as part of the user's IM environment so that available merchandise as determined by the context engine will be pulled from existing content and presented for simulated purchase. The application may be run on a single or multiple Windows® configured computer.

The described content management system (CMS) 201 will administer content for use by a context engine of the application to pull relevant content based on the chat stream and present it for simulated purchase within the contextual storefront or within a separate merchandising window.

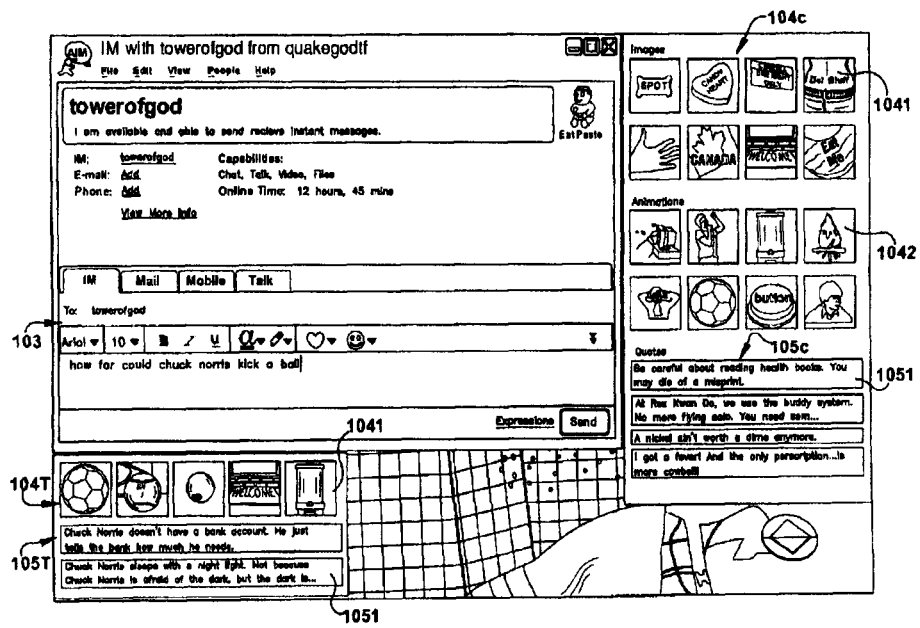

The invention claimed is:

1. A system for the presentation and use of graphical and textual content in connection with electronic messaging systems, the system comprising:

a first display which includes a conversation box and a text entry box, the conversation box configured to display messages which are entered by a first user and a second user into the text entry box;

a conversation box graphical storefront including a first set of one or more graphical images which are selected from a database of graphical images for inclusion in the conversation box graphical storefront based upon textual content which appears in the conversation box;

a conversation box textual storefront including a first set of one or more text items which are selected from a database of text items based upon textual content which appears in the conversation box;

a text entry box graphical storefront including a second set of one or more graphical images which are selected from a database of graphical images for inclusion in the text entry box graphical storefront based upon textual content which appears in the text entry box;

a text entry box textual storefront including a second set of one or more text items which are selected from a database of text items based upon textual content which appears in the text entry box, system operative to enable selection by a client-user of a graphical image from the conversation box graphical storefront, the conversation box textual storefront, the text entry box textual storefront or the text entry box graphical storefront for insertion into the text entry box.

2. The system of claim 1 further comprising means to select and display content in the conversation box graphical storefront based upon an intersection of keywords detected in the text entry box and keywords detected in the conversation box.

3. The system of claim 1 further comprising means to select and display content in the text entry box graphical storefront based upon an intersection of keywords detected in the text entry box and keywords detected, in the conversation box.

4. The system of claim 1 further comprising means to select and display content in the text entry box textual storefront based upon an intersection of keywords detected in the text entry box and keywords detected in the conversation box.

5. The system of claim 1 further comprising means to select and display content in the conversation box textual storefront based upon an intersection of keywords detected in the text entry box and keywords detected in the conversation box.

6. The system of claim 1 further comprising means to enable addition of user-provided content for the conversation box graphical storefront or the text entry box graphical storefront.

7. The system of claim 1 further comprising means to enable addition of user-provided content for the conversation box textual storefront or the text entry box textual storefront.

8. The system of claim 1 further comprising means to detect one or more keywords in the textual content which appears in the text entry box or in the conversation box and to select and retrieve associated graphical images which are associated with detected keywords and to populate the conversation box graphical storefront or the text entry box graphical storefront with the associated graphical images.

9. The system of claim 1 further comprising means to detect one or more keywords in the textual content which appears in the text entry box or in the conversation box and to select and retrieve associated text items which are associated with detected keywords and to populate the text entry box textual storefront with the associated text items.

10. The system of claim 1 further comprising means to detect one or more keywords in the textual content which appears in the text entry box or in the conversation box and to select and retrieve associated text items which are associated with detected keywords and to populate the conversation box textual storefront with the associated text items.

11. An electronic messaging contextual storefront system comprising:

an application residing on an application server which is connected via a network to two or more client user devices capable of sending and receiving electronic messages which contain textual and graphic content;

the application server communicatively connected to a contextual storefront content server having access to multiple different items of textual and graphical content;

the application operative to retrieve from the contextual storefront content server multiple items of graphical and textual content based upon text content of messages sent or received via the system, and to generate a display which includes at least one contextual storefront which includes multiple items of graphical and textual content.

12. The system of claim 11 wherein the application retrieves multiple items of graphical and textual content from the contextual storefront content server based upon keywords detected in the text content of messages sent or received via the system.

13. The system of claim 12 wherein each of the keywords are associated with graphical or textual content in a database in or accessed by the contextual storefront content server.

14. The system of claim 12 wherein the application is operative to generate a display which includes a first contextual storefront associated with a conversation box and a second contextual storefront associated with a text entry box.

15. The system of claim 12 wherein the graphical and textual items are grouped together by subject matter in a database in or accessed by the contextual storefront content server.

16. The system of claim 12 wherein the application is operative to embed or insert one or more graphical items selected by a user from the contextual storefront within a text stream in a display generated by the application.

17. The system of claim 12 wherein the application is operative to embed or insert one or more textual items selected by a user from the contextual storefront within a text stream in a display generated by the application.

18. The system of claim 16 wherein the application is operative to record the selection by a user of one or more graphical items by a user from the contextual storefront.

19. The system of claim 17 wherein the application is operative to record the selection by a user of one or more textual items selected by a user from the contextual storefront.

20. The system of claim 11 further comprising a payment processing system for processing a payment as a pre-condition to user access to the items of textual or graphical content.

21. An electronic messaging contextual storefront system comprising:

an application residing on an application server which is connected via a network to two or more client user devices capable of sending and receiving electronic messages which contain textual and graphic content;

the application server communicatively connected to a contextual storefront content server having access to multiple different items of textual and graphical content;

the application operative to generate a display for the two or more client user devices, the display having a conversation box and a text entry box and at least one contextual storefront for displaying textual and graphic content;

the application further operative to retrieve from the contextual storefront content server multiple items of graphical and textual content based upon text content of messages sent or received via the system, and to display the multiple items of graphical and textual content within the at least one contextual storefront;

the application further operative to enable a client user to select one or more items of graphical or textual content from the at least one contextual storefront for placement in the conversation box or text entry box.

22. The electronic messaging contextual storefront system of claim 21 wherein the application is operative to retrieve multiple items of graphical or textual content from the contextual storefront content server based upon keywords detected in the text entry box or in the conversation box.

23. The electronic messaging contextual storefront system of claim 21 wherein the application is operative to retrieve multiple items of graphical or textual content from the contextual storefront content server based upon an intersection of keywords detected in the text entry box and in the conversation box.

24. The electronic messaging contextual storefront system of claim 21 wherein the application is further operative to process payments for client user access to graphical or textual content displayed in the contextual storefront.

* * * * *

UNITED STATES PATENT AND TRADEMARK OFFICE
CERTIFICATE OF CORRECTION

| | | |
|---|---|---|
| PATENT NO. | : 7,890,876 B1 | |
| APPLICATION NO. | : 11/836453 | |
| DATED | : February 15, 2011 | |
| INVENTOR(S) | : Mandelbaum et al. | |

It is certified that error appears in the above-identified patent and that said Letters Patent is hereby corrected as shown below:

On title page, Item (75), please remove both Bryan A. Biniak and Dave Highman from the list of inventors as shown on attached page.

Signed and Sealed this
Twenty-sixth Day of April, 2011

David J. Kappos
*Director of the United States Patent and Trademark Office*

(12) United States Patent
Mandelbaum et al.

(10) Patent No.: US 7,890,876 B1
(45) Date of Patent: Feb. 15, 2011

(54) ELECTRONIC MESSAGING CONTEXTUAL STOREFRONT SYSTEM AND METHOD

(75) Inventors: Josef A. Mandelbaum, Beachwood, OH (US); Benjamin J. Tripoli, Woodbury, MN (US); Jeffrey M. Rapp, Minneapolis, MN (US); Bryan A. Malkowski, Lilydale, MN (US); Jason S. Jhonson, Cupertino, CA (US)

(73) Assignee: American Greetings Corporation, Cleveland, OH (US)

(*) Notice: Subject to any disclaimer, the term of this patent is extended or adjusted under 35 U.S.C. 154(b) by 804 days.

(21) Appl. No.: 11/836,453

(22) Filed: Aug. 9, 2007
(Under 37 CFR 1.47)

(51) Int. Cl.
*G06F 3/00* (2006.01)
(52) U.S. Cl. .................... 715/758; 715/744
(58) Field of Classification Search .................. 715/758
See application file for complete search history.

(56) References Cited

U.S. PATENT DOCUMENTS

| | | | |
|---|---|---|---|
| 7,234,117 B2 * | 6/2007 | Zaner et al. | 715/758 |
| 7,478,129 B1 * | 1/2009 | Chemtob | 709/204 |
| 7,503,007 B2 * | 3/2009 | Goodman et al. | 715/758 |
| 2002/0077135 A1 * | 6/2002 | Hyon | 455/466 |
| 2004/0162877 A1 * | 8/2004 | Van Dok et al. | 709/204 |
| 2005/0156873 A1 * | 7/2005 | Walter et al. | 345/156 |
| 2008/0101701 A1 * | 5/2008 | Rainisto | 382/187 |
| 2008/0214214 A1 * | 9/2008 | Reissmueller et al. | 455/466 |
| 2008/0244446 A1 * | 10/2008 | LeFevre et al. | 715/810 |
| 2009/0019117 A1 * | 1/2009 | Bonforte et al. | 709/206 |
| 2010/0138756 A1 * | 6/2010 | Saund et al. | 715/758 |

* cited by examiner

*Primary Examiner* — Ryan F Pitaro
(74) *Attorney, Agent, or Firm* — Roetzel & Andress; James C. Scott

(57) ABSTRACT

An electronic messaging contextual storefront system and application provides electronic and instant messaging with contextual graphical and textual content which corresponds with or is related to the subject matter of an electronic or instant message string or chat stream. Graphical and textual content for the contextual storefronts is retrieved based upon detected keywords, and presented in contextual storefronts which are associated with conversation and text entry boxes or other parts of an electronic message system display. Selected graphical and textual content can be placed directly in the text stream or elsewhere in the display either by user commands or automatically by the system. The graphical and textual content is stored by subject matter or theme or by association with keywords in a relational database. Access to contextual storefront content can be tracked, accounted for and controlled by a payments processing system.

24 Claims, 7 Drawing Sheets